US009897744B2

United States Patent
Ligtenberg et al.

(10) Patent No.: US 9,897,744 B2
(45) Date of Patent: Feb. 20, 2018

(54) BACKLIGHT ASSEMBLY HAVING ASSYMETRIC LIGHT LEAKAGE PROMOTING FEATURES

(71) Applicant: Apple Inc., Cupertino, CA (US)

(72) Inventors: Christiaan A. Ligtenberg, San Carlos, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 15/151,171

(22) Filed: May 10, 2016

(65) Prior Publication Data

US 2017/0090105 A1   Mar. 30, 2017

Related U.S. Application Data

(60) Provisional application No. 62/234,257, filed on Sep. 29, 2015.

(51) Int. Cl.
*F21V 8/00* (2006.01)

(52) U.S. Cl.
CPC ........... *G02B 6/0061* (2013.01); *G02B 6/009* (2013.01); *G02B 6/0035* (2013.01); *G02B 6/0051* (2013.01); *G02B 6/0068* (2013.01); *G02B 6/0085* (2013.01)

(58) Field of Classification Search
CPC .... G02B 6/0061; G02B 6/0085; G02B 6/009; G02B 6/0035; G02B 6/0068; G02B 6/0051
See application file for complete search history.

(56) References Cited

U.S. PATENT DOCUMENTS

| | | |
|---|---|---|
| 7,278,775 B2 | 10/2007 | Yeo et al. |
| 7,845,826 B2 | 12/2010 | Aylward et al. |
| 8,888,356 B2 | 11/2014 | Son et al. |
| 2012/0268963 A1 | 10/2012 | Gourlay |
| 2016/0147006 A1 | 5/2016 | Large |

*Primary Examiner* — Tracie Y Green
(74) *Attorney, Agent, or Firm* — Treyz Law Group, P.C.; Kendall W. Abbasi

(57) ABSTRACT

An electronic device may have a display including an array of display pixels and a backlight assembly that provides backlight for the array of pixels. The backlight assembly may include a light guide layer having first and second opposing sides. The first side of the light guide layer may receive light from a first light source and the second side of the light guide layer may receive light from a second light source. To avoid overheating the first light source, the light emitted by the first light source may be less bright than the light emitted by the second light source. To compensate for the reduced brightness of the first light source, light leakage promotion features on the light guide layer may have a peak density that is closer to the first side of the light guide layer than the second side of the light guide layer.

20 Claims, 11 Drawing Sheets

BACKLIGHT ASSEMBLY HAVING ASSYMETRIC LIGHT LEAKAGE PROMOTING FEATURES

This application claims the benefit of provisional patent application No. 62/234,257 filed on Sep. 29, 2015, which is hereby incorporated by reference herein in its entirety.

BACKGROUND

This relates generally to electronic devices and, more particularly, to electronic devices with displays and associated backlight structures.

Electronic devices such as computers and cellular telephones have displays. Some displays such as plasma displays and light-emitting diode displays have arrays of pixels that generate light. In displays of this type, backlighting is not necessary because the pixels themselves produce light. Transmissive displays, such as liquid crystal displays, contain passive display pixels. The pixels in a liquid crystal display can alter the amount of light that is transmitted through the display to display information for a user but do not produce light. As a result, it is often desirable to provide backlight for a transmissive display such as liquid crystal display.

In a typical backlight structure for a display such as a liquid crystal display, a light guide plate is used to distribute backlight generated by a light source such as a light-emitting diode light source. Optical films such as a diffuser layer and brightness enhancing film may be placed on top of the light guide plate. A reflector may be formed under the light guide plate to improve backlight efficiency.

To provide satisfactory backlighting, it may be desirable to locate strips of light-emitting diodes on the top and bottom sides of a light guide layer. The top and bottom strips of light-emitting diodes are typically fixed to a metal chassis. To accommodate thermal expansion of the light guide layer, which is attached along one of its edges to the metal chassis, conventional designs incorporate relatively large air gaps (e.g., a gap of about 0.6 mm) between the light-emitting diodes and the light guide layer. The use of such large gaps can have an adverse impact on backlight efficiency. Poor backlight efficiency, in turn, may decrease power consumption efficiency and can reduce battery life in an electronic device.

It would therefore be desirable to be able to provide electronic devices with improved displays and backlights.

SUMMARY

An electronic device may have a display including an array of display pixels and a backlight assembly that provides backlight for the array of pixels.

The backlight assembly may include a light guide layer having first and second opposing sides and a thermally conductive chassis that at least partially surrounds the light guide layer. Light leakage promotion features may be provided on the surface of the light guide layer to allow light to escape from the light guide layer to the array of pixels.

The first side of the light guide layer may receive light from a first light source that is free to move relative to the chassis and the second side of the light guide layer may receive light from a second light source that is fixed relative to the chassis. The chassis may serve as a heat sink for the second light source.

To avoid overheating the first light source, the light emitted by the first light source may be less bright than the light emitted by the second light source. This may be achieved by driving the first light source at a lower power than the second light source and/or by using fewer light-emitting diodes to form the first light source than that used to form the second light source.

To compensate for the brightness difference between light received by the first side of the light guide layer and light received by the second side of the light guide layer, the light leakage promotion features may have a peak density that is closer to the first side of the light guide layer than the second side of the light guide layer. Since the amount of light that escapes from a given portion of the light guide layer is proportional to the density of light leakage promotion features, positioning the peak density closer to the first light source may compensate for the reduction in brightness of the light provided by the first light source. The asymmetric design of the light leakage promotion features relative to the center of the light guide layer combined with the asymmetric light source arrangement may counterbalance one another to form a uniform backlight for the display.

Further features will be more apparent from the accompanying drawings and the following detailed description.

DETAILED DESCRIPTION

Electronic devices may include displays. The displays may be used to display images to a user. Illustrative electronic devices that may be provided with displays are shown in FIGS. 1, 2, 3, and 4.

Figure 1:
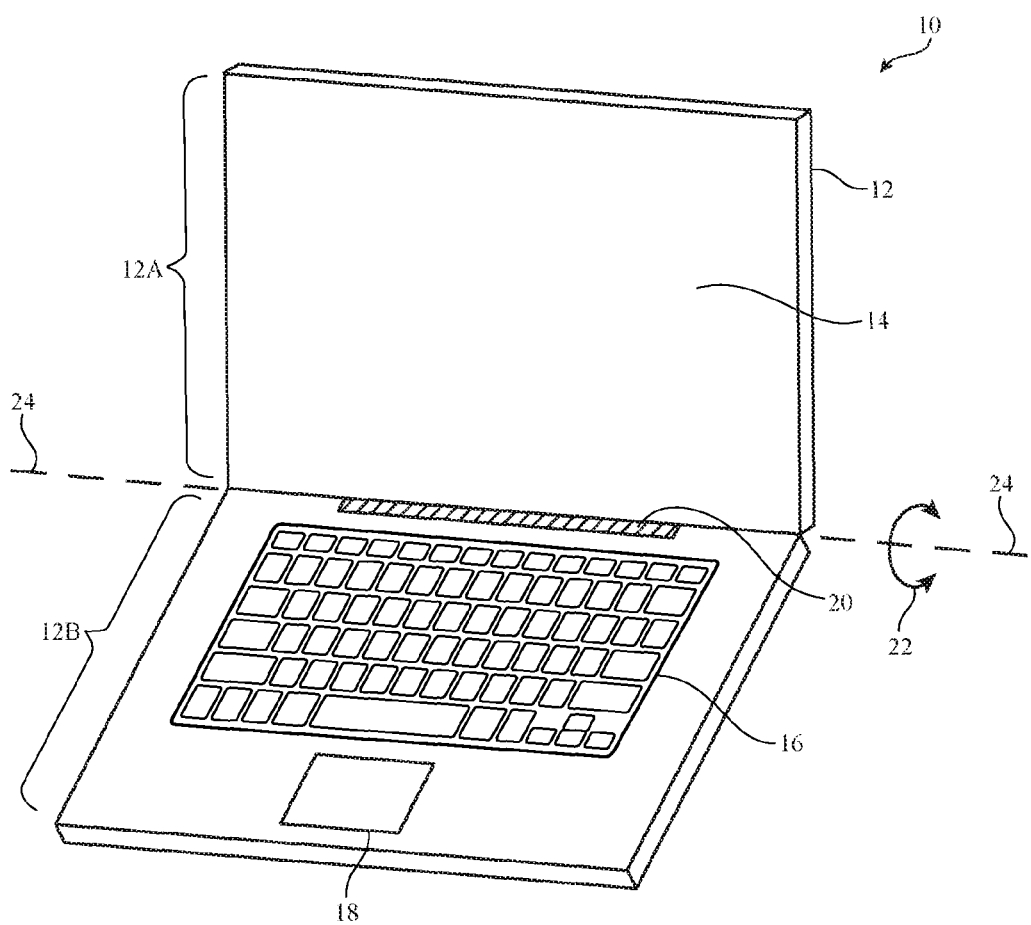
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
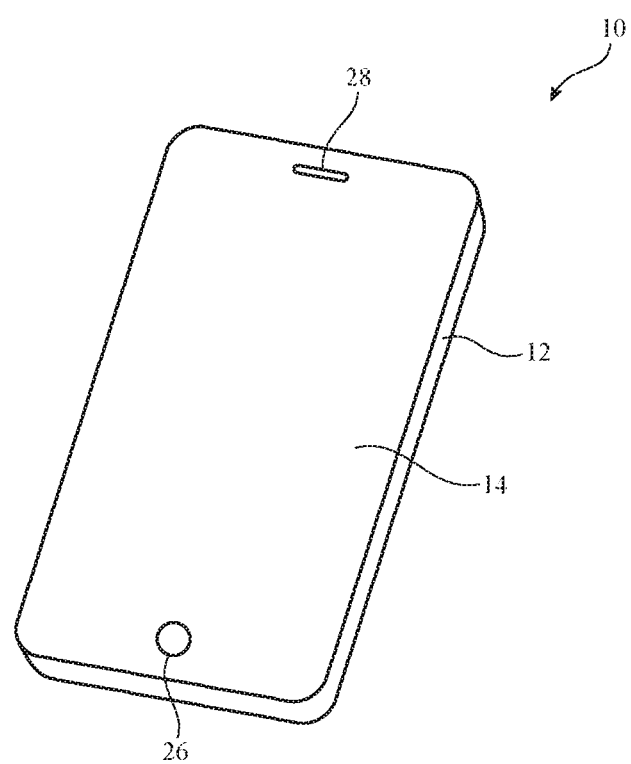
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, watch, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2). In compact devices such as wrist-watch devices, port 28 and/or button 26 may be omitted and device 10 may be provided with a strap or lanyard.

Figure 3:
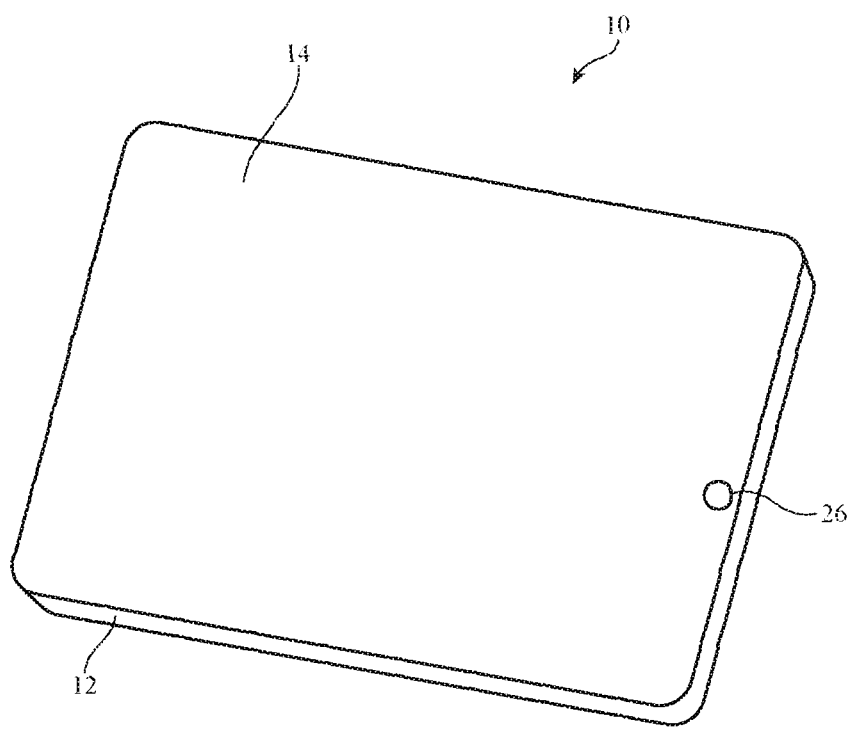
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
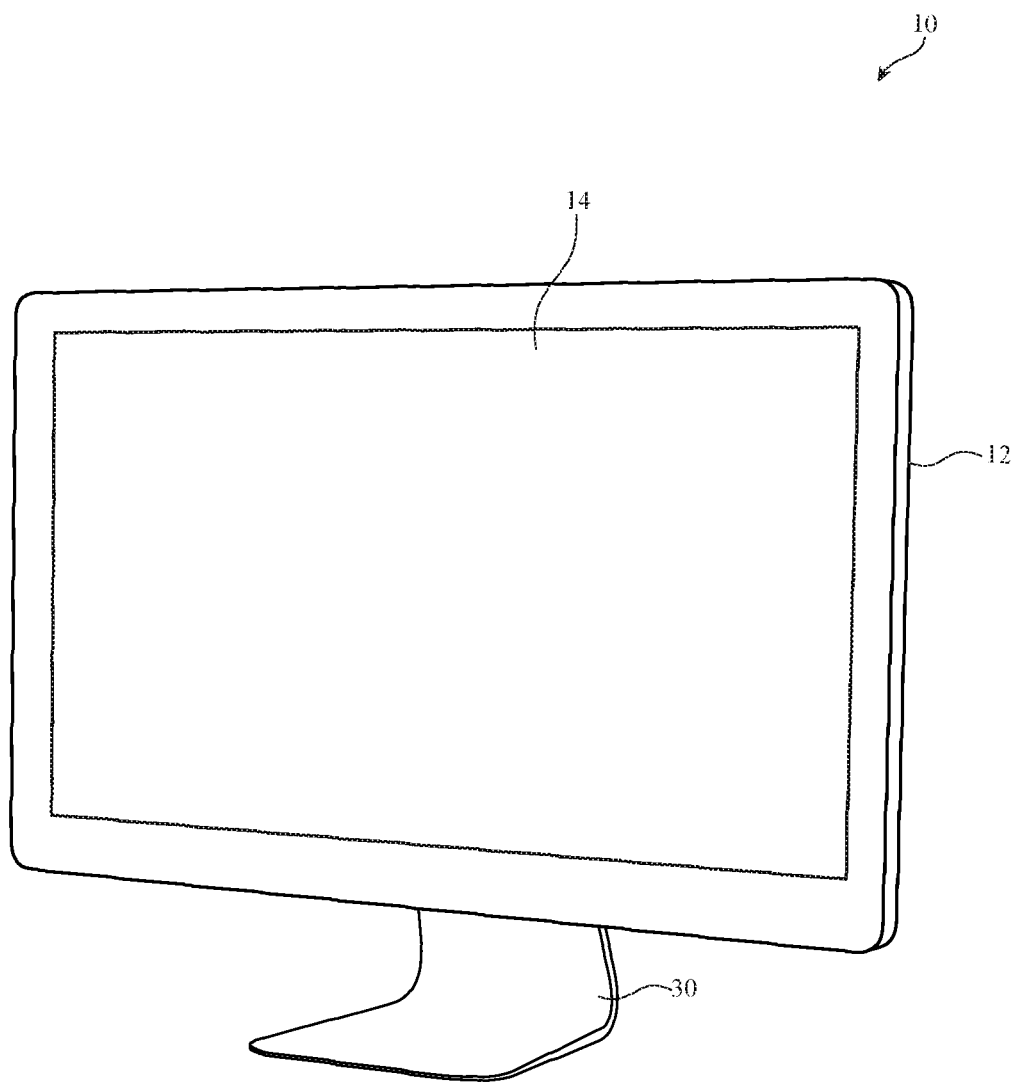
FIG. 4 is a perspective view of an illustrative electronic device such as a computer or other device with display structures in accordance with an embodiment.

FIG. 4 shows how electronic device 10 may be a display such as a computer monitor, a computer that has been integrated into a computer display, or other device with a built-in display. With this type of arrangement, housing 12 for device 10 may be mounted on a support structure such as stand 30 or stand 30 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
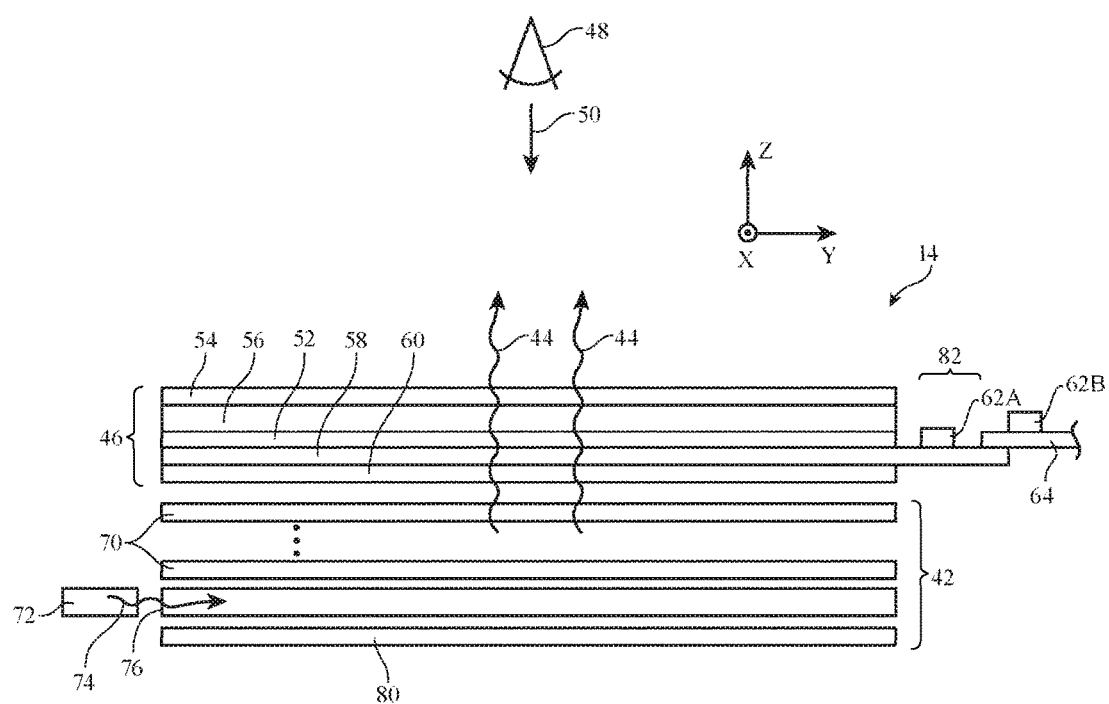
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide layer such as light guide layer 78 (sometimes referred to as a light guide structure or light guide). Light guide layer 78 may be formed from one or more stacked layers of transparent material such as clear glass or plastic (e.g., molded plastic that forms a light guide plate, a thin flexible plastic film, etc.). During operation of backlight structures 42, a light source such as light source 72 may generate light 74. Light source 72 may be, for example, an array of light-emitting diodes.

Light 74 from light source 72 may be coupled into side surface 76 of light guide layer 78 and may be distributed in dimensions X and Y throughout light guide layer 78 due to the principal of total internal reflection. Light guide layer 78 may include light-scattering features such as pits or bumps. The light-scattering features may be located on an upper surface and/or on an opposing lower surface of light guide layer 78. Light source 72 may be located at the left side of light guide layer 78 as shown in FIG. 5 or may be located along the right side of plate 78 and/or other sides of plate 78.

Light 74 that scatters upwards in direction Z from light guide layer 78 may serve as backlight 44 for display 14. Light 74 that scatters downwards may be reflected back in the upwards direction by reflector 80. Reflector 80 may be formed from a reflective material such as a layer of plastic covered with a dielectric mirror thin-film coating.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide layer 78 and reflector 80. For example, if light guide layer 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Figure 6:
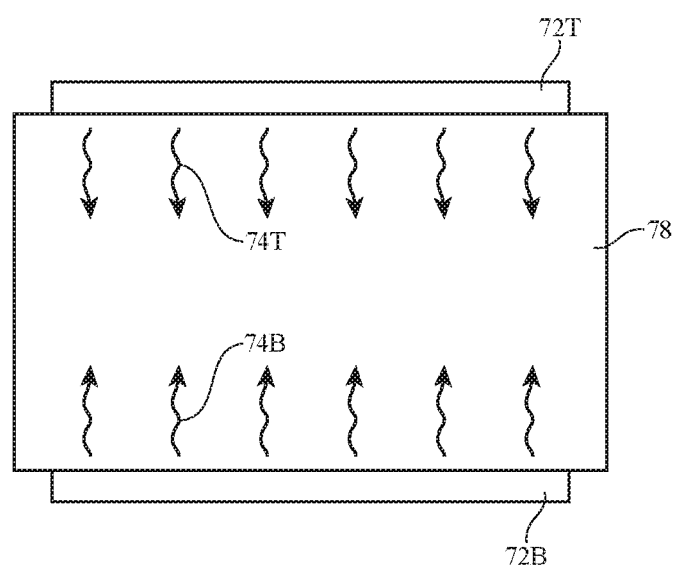
FIG. 6 is a top view of an illustrative display backlight assembly showing how two strips of light-emitting diodes may be used in providing backlight for a display in accordance with an embodiment.

To provide backlight illumination of sufficient strength and uniformity, it may be desirable to launch light 74 into light guide layer 78 from more than one side of layer 78. As shown in the top view of light guide layer 78 of FIG. 6, for example, light 74T may be emitted into light guide layer 78 using a first strip of light-emitting diodes such as light-emitting diodes 72T along the top side of light guide layer 78 and using a second strip of light-emitting diodes 72B along the bottom side of light guide layer 78. As backlight travels through the pixel structures of the display layers above backlight unit 42 (FIG. 5), the pixel structures display an image for the user of device 10.

Figure 7:
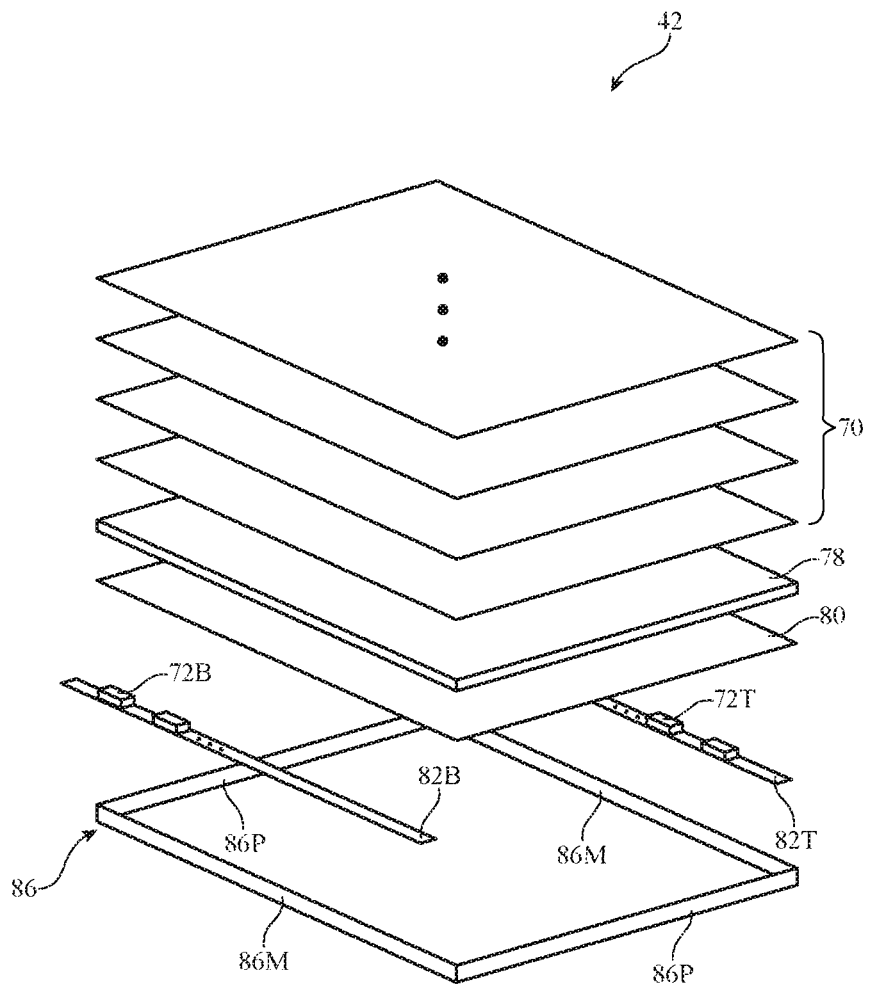
FIG. 7 is a perspective view of illustrative structures in a backlight assembly in accordance with an embodiment.

FIG. 7 is an exploded perspective view of display structures that may be used in forming a display module for display 14. As shown in FIG. 7, backlight assembly 42 may include support structures such as support structure 86. A top strip of light-emitting diodes such as top light-emitting diodes 74T may be mounted on printed circuit 82T and a bottom strip of light-emitting diodes such as bottom light-emitting diodes 72B may be mounted on printed circuit 82B. Printed circuits such as printed circuits 82T and 82B may be rigid printed circuits formed using rigid layers of dielectric such as fiberglass-filled epoxy or other suitable dielectric material, may be flexible printed circuits formed from sheets of polyimide or other layers of polymer, or may be include a combination of rigid and flexible layers (sometimes referred to as "rigid-flex" printed circuits).

If desired, top printed circuit 82T and bottom printed circuit 82B may be different types of printed circuits. For example, top printed circuit 82T may be a flexible printed circuit and bottom printed circuit 82B may be a rigid printed circuit. This is, however, merely illustrative. If desired, top printed circuit 82T may be rigid and bottom printed circuit 82B may be flexible, both printed circuits 82T and 82B may be rigid, or both printed circuits 82T and 82B may be flexible. Embodiments where top printed circuit 82T is a flexible printed circuit and bottom printed circuit 82B is a rigid printed circuit are sometimes described herein as an example.

Optical films 70, light guide layer 78, reflector 80, light-emitting diodes 74T (and associated printed circuit 82T), and light-emitting diodes 74B (and associated printed circuit 82B) mounted within support structures such as support structure 86. Display layers such as polarizer layers 60 and 54, thin-film transistor layer 58, liquid crystal layer 52, and color filter layer 56 of FIG. 5 may also be mounted in support structure 86 (e.g., by placing these layers on layers 70).

Support structure 86 may sometimes be referred to as chassis members or chassis structures and may be formed from materials such as plastic, ceramic, fiber composites, metal, or other suitable materials. In one illustrative arrangement, chassis 86 includes both metal and plastic parts. For example, chassis 86 may include metal portions 86M (sometimes referred to as a metal chassis or m-chassis) and plastic portions 86P (sometimes referred to as a plastic chassis or p-chassis). If desired, display 14 may be formed by mounting light-emitting diodes 72T and 72B, optical films 70, and other display structures directly within housing 12 or by mounting light-emitting diodes 72T and 72B, optical films 70, and other display structures in support structures of other shapes. In the illustrative configuration of FIG. 7, metal chassis 86M and plastic chassis 86P are used in forming a display module for display 14 that may be mounted within housing 12 under a display cover. Other mounting configurations may be used, if desired.

To help improve backlight efficiency, it may be desirable to minimize gaps between light-emitting diodes and light-guide plate 78, while ensuring that the resulting structures will be able to accommodate thermal expansion and contraction of light-guide plate 78 during use of device 10 in hot and cold environments. With one suitable arrangement, light-emitting diodes 72T are attached light guide layer 78 along the top side of light guide layer without being attached to surrounding support structures. This allows light-emitting diodes 78T to be free to move with respect to surrounding support structures such as chassis 86 during thermal expansion and contraction events, while maintaining a small separation between light-emitting diodes 72T and light-guide plate 78. At the opposing bottom side of light guide layer 78, light guide layer 78 and light-emitting diodes 72B may be attached to support structures such as m-chassis 86M in a fixed arrangement that does not permit light-emitting diodes 72B to move with respect to m-chassis 86M. As with the floating top side of light guide layer 78, the gap between light emitting diodes 72B and light guide layer 78 may be minimized at the fixed bottom side of light guide layer 78.

Figure 8:
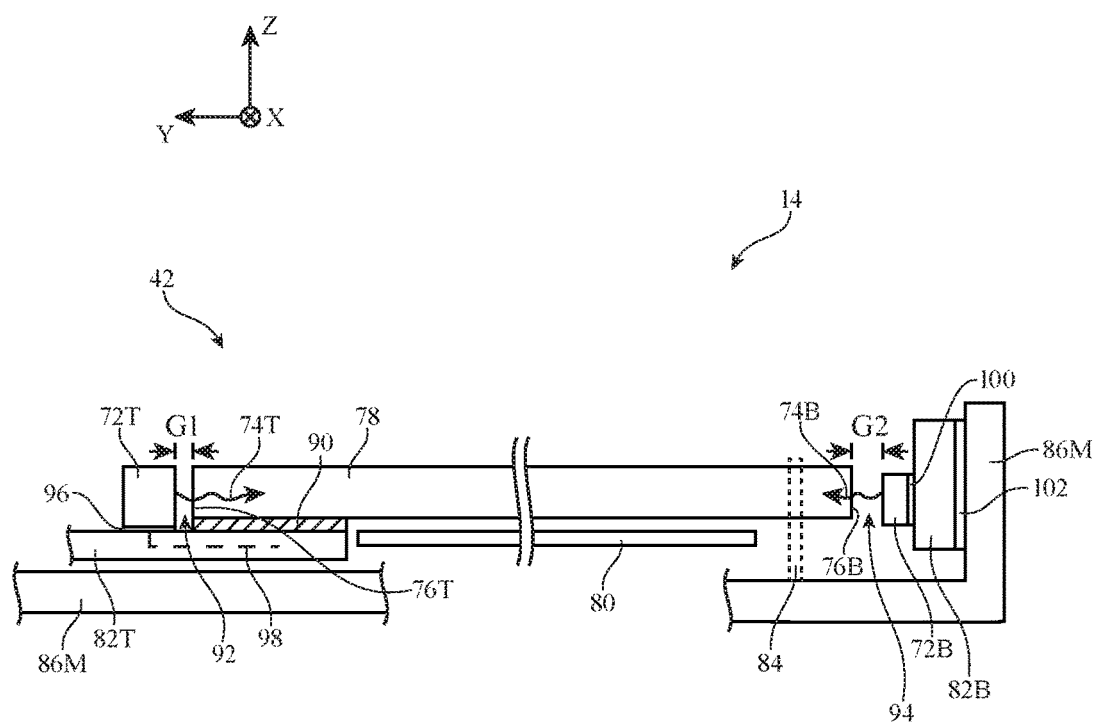
FIG. 8 is a cross-sectional side view of a light guide layer having first and second opposing sides that receive light respectively from first and second strips of light-emitting diodes in accordance with an embodiment.

FIG. 8 is a cross-sectional side view of a portion of display 14 in the vicinity of backlight structures 42. As shown in FIG. 8, top light-emitting diodes 72T may be attached to light-guide plate 78 so that light 74T from light-emitting diodes 72T may be efficiently emitted from light-emitting diodes 72T into the top side of light guide layer 78 across gap 92. Gap 92 may be filled with air or an adhesive and may (for at least some of the light-emitting diodes 72T) be characterized by a gap width G1 of about 0.2 mm (e.g., less than 0.6 mm, less than 0.5 mm, less than 0.4 mm, less than 0.3 mm, less than 0.2 mm, or less than 0.1 mm). Small gap widths such as these may be achieved since light-emitting diodes 72T are fixed relative to light guide layer 78 and floating relative to m-chassis 86M, thereby allowing light-emitting diodes 72T to move with light guide layer 78 as it expands or contracts.

Light-emitting diodes 72T may extend in a strip along dimension X (into the page in the orientation of FIG. 8) and may be electrically connected to metal traces 98 in flex circuit 82T. Light-emitting diodes 72T may be, for example, soldered to metal pads on the upper surface of flex circuit 82T using solder 96. During operation of device 10, electrical power may be supplied to light-emitting diodes 72T using traces 98.

The distance between light-emitting diodes 72T and light guide layer 78 along lateral dimension Y may be fixed by attaching light guide layer 78 to flex circuit 82T. As shown in FIG. 8, light guide layer 78 may be attached to flex circuit 82T using adhesive such as optically clear adhesive 90. A reflective layer such as printed white ink or white tape may be interposed between optically clear adhesive 90 and flex circuit 82T to help reflect light 74T into light guide layer 78. The reflective layer may be attached to flex circuit 82T using an additional layer of adhesive (e.g., between the reflective layer and flex circuit 82T) or may be formed from reflective material that is incorporated into adhesive 90.

At the opposing bottom side of light guide layer 78, a strip of bottom light-emitting diodes 72B may be soldered to printed circuit 82B. Printed circuit 82B may be attached to m-chassis 86M using a layer of adhesive such as conductive adhesive 102. After using adhesive 102 to secure light-emitting diodes 72B and printed circuit 82B to m-chassis 86M, the position of light-emitting diodes 72B is fixed with respect to m-chassis 86M.

In the configuration shown in FIG. 8, the lower strip of light-emitting diodes (i.e., bottom light-emitting diodes 74B) and bottom printed circuit 82B are attached to m-chassis 86M and do not move relative to m-chassis 86M.

To maintain a consistent position of light guide layer 78 relative to light-emitting diodes 72B, light guide layer 78 may be mounted to chassis 86 using mounting structures such as mounting structure 84. Mounting structure 84 may be a pin that extends through an opening in light guide layer 78 to hold light guide layer 78 in place relative to chassis 86. Because light guide layer 78 is anchored to chassis 86 (e.g., to m-chassis 86M or p-chassis 86P), light guide layer 78 may be mounted in a fixed relation to bottom light-emitting diodes 72B. If desired, other mounting arrangements may be used. For example, light guide layer 78 may include a protrusion that extends through a recess or opening in chassis 86 or that is received by a portion of housing 12 (FIG. 1)

As shown in FIG. 8, bottom light-emitting diodes 72B emit light into the bottom side of light guide layer 78 across gap 94. Gap 94 may be filled with air or adhesive and may (for at least some of the light-emitting diodes 72B) be characterized by a gap width G2 of about 0.2 mm (e.g., less than 0.6 mm, less than 0.5 mm, less than 0.4 mm, less than 0.3 mm, less than 0.2 mm, or less than 0.1 mm).

To accommodate thermal contraction and expansion in light guide layer 78, the upper side of light guide layer may be attached to top light-emitting diodes 72T in a fixed relationship, without attaching light-emitting diodes 72T, flex circuit 82T, or the upper side of light guide layer 78 to m-chassis 86M. The bottom side of display 14 may therefore have a light guide layer and light-emitting diode backlight source that are in a fixed position relative to chassis 86, whereas the top side of display 14 may have a light guide layer and light-emitting diode backlight source that are free to move relative to chassis 86.

Bottom light-emitting diodes 72B may be top-emitting diodes (e.g., where light is emitted from a top surface opposite the bottom surface that is mounted to the substrate) and top light-emitting diodes 72T may be side-emitting diodes (e.g., where light is emitted from a side surface adjacent to the bottom surface that is mounted to the substrate). This is, however, merely illustrative. If desired, bottom light-emitting diodes 72B may be side-emitting diodes and top light-emitting diodes 72T may be top-emitting diodes.

Heat may be produced by the operation of light-emitting diodes 72 and other components in electronic device 10 such as processing circuitry, camera flash units, communications circuits such as circuits involved in communicating with external equipment, video circuits, and other devices.

If care is not taken, high-temperature operation can degrade the performance of displays, causing light-emitting diode light output to decrease over time. When light-emitting diodes are simultaneously operated at elevated drive power levels and elevated temperatures, lumen depreciation can be accelerated (i.e., light-emitting diode lifetimes may be shortened).

To conduct heat away from bottom light-emitting diodes 72B, printed circuit 82B may be a metal-core printed circuit (e.g., having an aluminum core or other suitable thermally conductive core) that conducts heat away from light-emitting diodes 72B to m-chassis 86M. M-chassis 86M may be a thermally conductive material that serves as a heat sink for bottom light-emitting diodes 72B.

Since top light-emitting diodes 72T are not directly attached to m-chassis 86M, heat sink structures may be formed on or incorporated into flex circuit 82T. For example, a coating of copper or other thermally conductive material may be formed on the top surface of flex circuit 82T.

If desired, the risk of overheating top light-emitting diodes 72T may be reduced by reducing the drive power provided to top light-emitting diodes 72T and/or by using fewer light-emitting diodes 72T. For example, light-emitting diodes 72T may be driven at a drive power value that is 90%, 80%, 60%, 50%, less than 70%, or greater than 70% of the drive power value that is used to drive bottom light-emitting diodes 72B. The number of top light-emitting diodes 72T may be equal to the number of bottom light-emitting diodes 72B or may be 80%, 60%, 50%, 90%, less than 70%, or greater than 70% of the number of bottom light-emitting diodes 72B.

Figure 9:
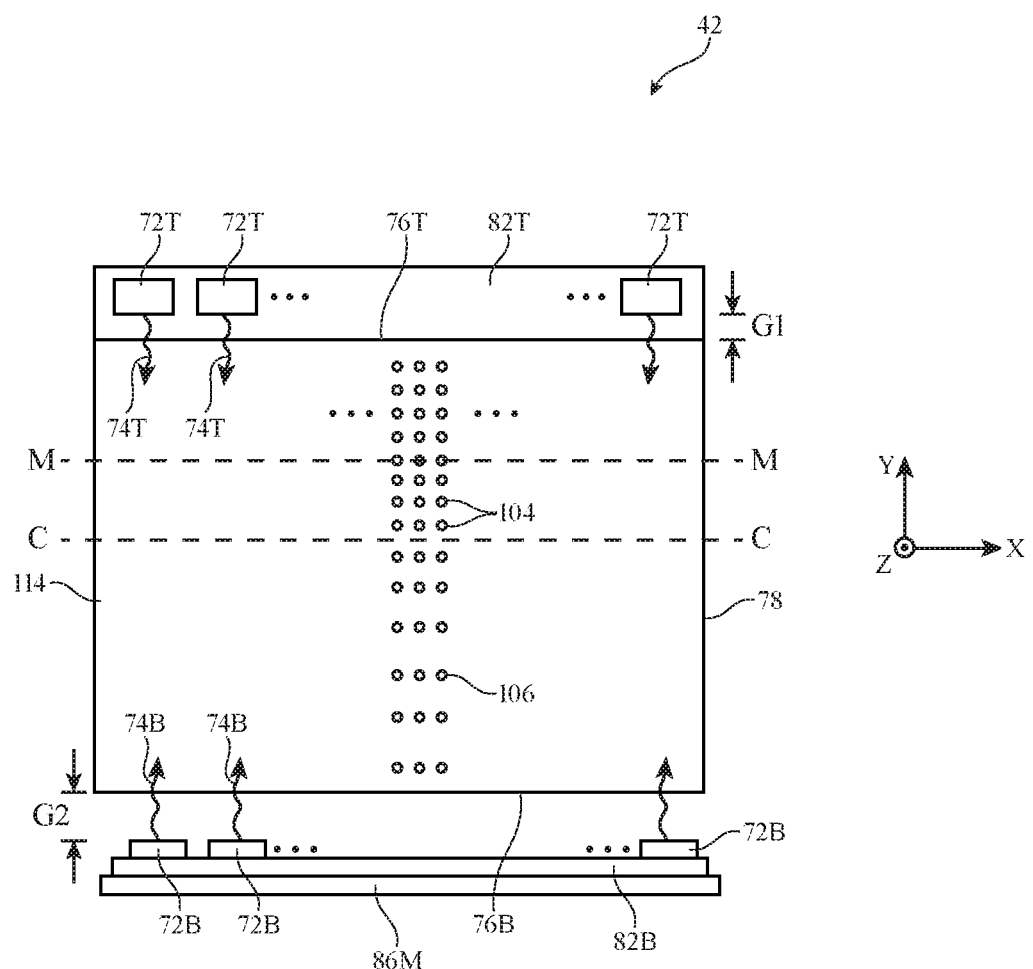
FIG. 9 is a top view of illustrative backlight structures having asymmetric light leakage promotion features in accordance with an embodiment.

FIG. 9 is a top view of illustrative backlight structures 42 of the type shown in FIG. 8. As shown in FIG. 9, top light-emitting diodes 72T emit light 74T into top side 76T of light guide layer 78. Bottom light-emitting diodes 72B emit light 74B into bottom side 76B of light guide layer 78.

In backlit displays, care must be taken to ensure that backlight is uniform across the display. To produce uniform backlight, upper surface 114 of light guide layer 78 may have light leakage promotion structures 104 that help scatter light out of light guide layer 78 in a direction parallel to the Z-axis of FIG. 9. Light leakage promotion structures 104 (sometimes referred to as light leakage promotion features, light scattering features, may be formed by roughening or forming notches in surface 114 of light guide layer 78. As light propagates within light guide layer 78 (e.g., via total internal reflection), the roughened texture of surface 114 may promote light leakage from light guide layer 78 in direction Z to provide backlight for display 14.

The example of FIG. 9 in which light leakage promotion features 104 are formed on upper surface 114 of light guide layer 78 (e.g., the light-exiting surface) is merely illustrative. If desired, light leakage promotion features 104 may be formed on an opposing lower surface of light guide layer 78.

Reducing the drive power to and/or reducing the number of top light-emitting diodes 72T may help avoid overheating light-emitting diodes 72T. However, the reduction in number and/or drive power may result in a reduced brightness at top side 76T of light guide layer 78 relative to bottom side 76B of light guide layer 78. For example, the brightness of light 74T emitted by top light-emitting diodes 72T (e.g., the brightness of light emitted from each individual light-emitting diode 72T and/or the brightness of light collectively emitted by the strip of light-emitting diodes 72T) may be less than the brightness of light 74B emitted by bottom of light-emitting diodes 72B.

To compensate for the difference in brightness at side 76T relative to the brightness at side 76B, light leakage promotion features 104 may be designed to allow more light to escape near top side 76T of light guide layer 78 than bottom side 76B. For example, instead of having the peak amount of light leakage occur at the center of light guide layer 78 (e.g., along axis C of FIG. 9), the peak amount of light leakage may occur at line M (e.g., somewhere between top side 76T and center line C of light guide layer 78). In the example of FIG. 9, light leakage promotion structures 104 have a maximum density along point M, which is closer to top side 76T than bottom side 76B of light guide layer 78.

The increased density of light leakage promotion structures 104 near top side 76T helps provide uniform backlight from surface 114. In particular, the combination of lower intensity light emitted into top side 76T of light guide layer 78 and the higher density of light leakage promotion structures 104 may lead to light of a given brightness escaping from the upper half of surface 114 (e.g., the portion of surface 114 between center line C and top side 76T). On the opposing side, the combination of higher intensity light emitted into bottom side 76B of light guide layer 78 and the lower density of light leakage promotion structures 104 may lead to light of the same given brightness escaping from the lower half of surface 114 (e.g., the portion of surface 114 between center line C and bottom side 76B). In this way, even though backlight structures 42 are asymmetric about center axis C, backlight that escapes from surface 114 towards display layers 46 (FIG. 5) will be uniform across surface 114.

Asymmetric light leakage promotion features 104 may be formed using any suitable technique. Light leakage promotion features 104 may be a grid of ink dots printed on the light guide layer 78, particulates infused in light guide layer 78, etched grooves (e.g., vertical and/or horizontal lines etched into light guide layer 78), or other suitable structures, layers, or surface features that allow light to escape through surface 114 of light guide plate 78.

FIGS. 10-14 are illustrative examples of ways in which light guide layer 78 may be provided with asymmetric light leakage promotion structures.

Figure 10:
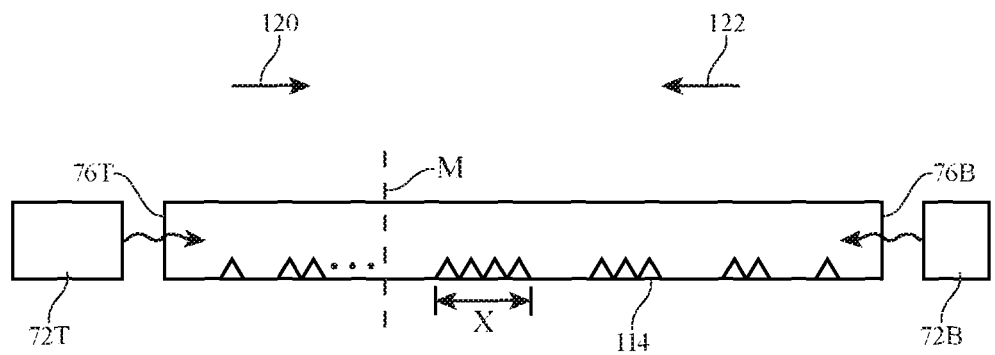
FIG. 10 is a cross-sectional side view of an illustrative light guide layer of the type shown in FIG. 9 with asymmetric light leakage promotion structures that vary in density in accordance with an embodiment.

In the example of FIG. 10, light leakage promotion features 104A may include a series of notches or roughened portions formed on surface 114 of light guide layer 78. The amount of notches or roughened portions in a given area X of surface 114 may define the density of features 104A. The density of roughened portions 104A between top side 76T and point M may increase along direction 120 as portions 104A approach point M. The density of roughened portions 104A between bottom side 76B and point M may increase along direction 122 as portions 104A approach point M. The increased density of light leakage promotion structures along line M may promote increased light leakage of those portions of light guide layer 78. Light leakage promotion structures 104A may have a maximum density at point M to increase light leakage from the upper half of surface 114 to compensate for the reduced intensity of light from top light-emitting diodes 72T relative to bottom light-emitting diodes 72B.

Figure 11:
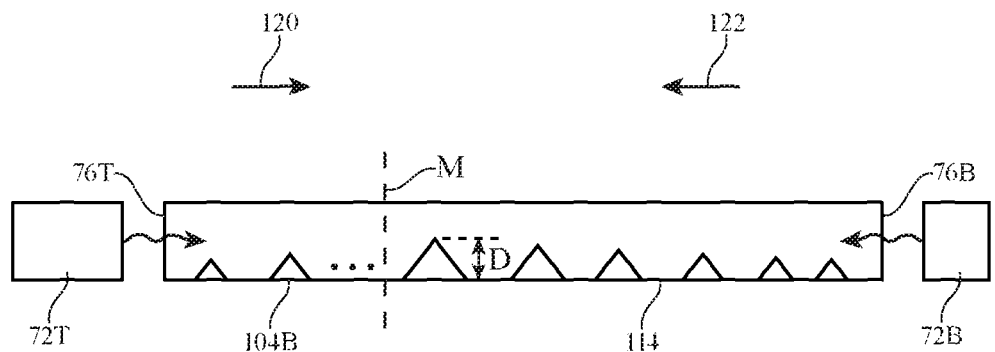
FIG. 11 is a cross-sectional side view of an illustrative light guide layer of the type shown in FIG. 9 with asymmetric light leakage promotion structures that vary in size in accordance with an embodiment.

FIG. 11 is another example of how light leakage promotion structures 104 may be asymmetric relative to the center of light guide layer 78 (e.g., center line C of FIG. 9). In the example of FIG. 11, light leakage promotion structures 104B may vary in size along a dimension of light guide layer 78 between sides 76T and 76B (e.g., parallel to the Y-axis of FIG. 9). Each roughened portion or notch 104B may have a depth such as depth D. The depth D of notches 104B between top side 76T and point M may increase along direction 120 as portions 104B approach point M. The depth of notches 104B between bottom side 76B and point M may increase along direction 122 as portions 104B approach point M. Deeper roughened portions (e.g., light leakage promotion structures of greater size) may promote increased light leakage in portions of light guide layer 78 that are farther away from light sources 72T and 72B. Light leakage promotion structures 104B may have a maximum depth at point M to increase light leakage from the upper half of surface 114 to compensate for the reduced intensity of light from top light-emitting diodes 72T relative to bottom light-emitting diodes 72B.

Figure 12:
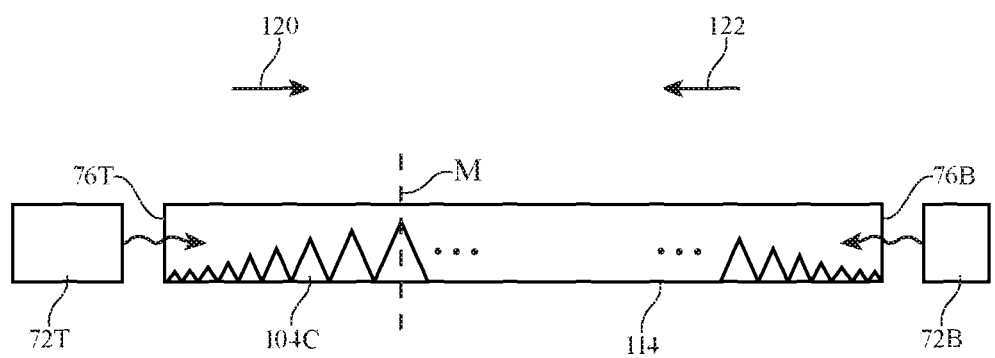
FIG. 12 is a cross-sectional side view of an illustrative light guide layer of the type shown in FIG. 9 with asymmetric light leakage promotion structures having one or more properties that vary continuously along a dimension of the light guide layer in accordance with an embodiment.
Figure 13:
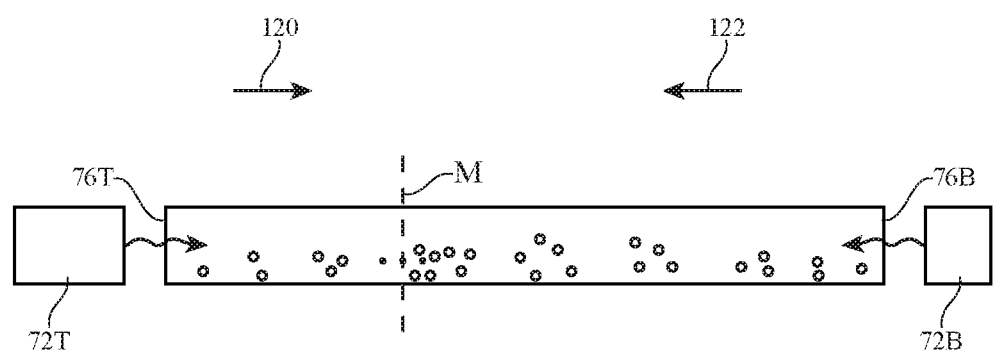
FIG. 13 is a cross-sectional side view of an illustrative light guide layer of the type shown in FIG. 9 with asymmetric light leakage promotion structures formed from embedded scattering structures in accordance with an embodiment.

FIG. 12 is another example of how light leakage promotion structures may be asymmetric to produce uniform backlight. As shown in FIG. 12, light leakage promotion structures 104C may be formed continuously along surface 114 of light guide layer 78. Light leakage promotion structures 104C may have one or more properties that change smoothly between to top side 76T and bottom side 76B (e.g., light leakage promotion structures 104C may vary according to a linear or curved gradient). For example, the depth of notches 104C between top side 76T and point M may increase gradually along direction 120. The depth of notches 104C between bottom side 76B and point M my increase gradually along direction 122. Other properties of light leakage promotion structures 104C that may vary gradually between the top and bottom sides of light guide layer 78 include size, shape, density, and/or material properties. Light leakage promotion structures 104C may be used to increase light leakage in portions of light guide layer 78 that are farther away from light sources 72T and 72B. Light leakage promotion structures 104C may result in a peak light leakage amount at point M to compensate for the reduced intensity of light from top light-emitting diodes 72T relative to bottom light-emitting diodes 72B.

If desired, light leakage promotion structures 104 in light guide layer 78 may be formed from embedded scattering structures such as particles, bubbles, and/or voids. As shown in the illustrative arrangement of FIG. 13, light leakage promotion structures 104D may be formed from bubbles filled with air, particles formed from materials with an index of refraction that is greater or less than the index of refraction of light guide layer 78, or particles or voids with other properties that scatter light from light sources 74T and 74B upwards through surface 114. Light leakage promotion structures 104D between top side 76T and point M may vary in size, shape, density, and/or material properties (e.g., index-of-refraction) along direction 120 as structures 104D approach point M. Light leakage promotion structures 104D between bottom side 76B and point M may vary in size, shape, density, and/or material properties (e.g., index-of-refraction) along direction 122 as structures 104D approach point M. Light leakage promotion structures 104D may result in peak light leakage at point M to compensate for the reduced intensity of light from top light-emitting diodes 72T relative to bottom light-emitting diodes 72B.

Figure 14:
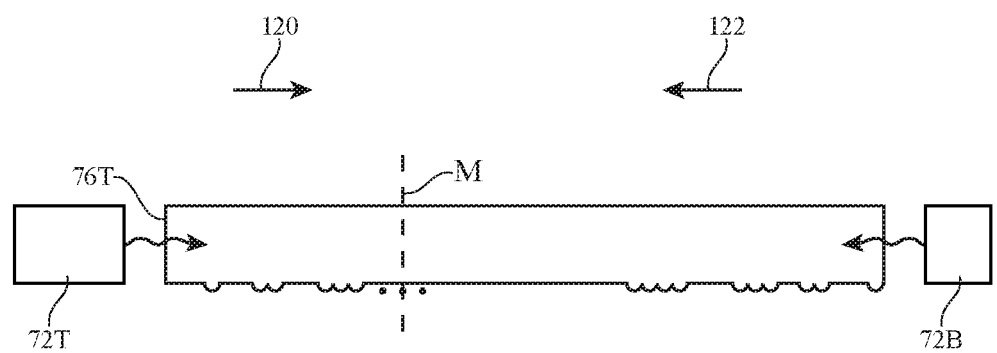
FIG. 14 is a cross-sectional side view of an illustrative light guide layer of the type shown in FIG. 9 with asymmetric light leakage promotion structures formed from protrusions in accordance with an embodiment.

If desired, light leakage promotion structures 104 in light guide layer 78 may be formed from other structures such as protrusions. As shown in FIG. 14, a series of protrusions such as protrusions 104E may be formed on surface 114 of light guide layer 78 and may be used to scatter light from light sources 72T and 72B upwards through surface 114. Protrusions 104E may be formed as integral portions of light guide layer 78 or may be separate structures that are formed on surface 114 of light guide layer 78. Protrusions 104E between top side 76T and point M may increase in size, shape, density, and/or material properties along direction 120 as protrusions 104E approach point M. Protrusions 104E between bottom side 76B and point M may increase in size, shape, density, and/or material properties along direction 122 as protrusions 104E approach point M. Light leakage promotion structures 104E may result in peak light leakage at point M to compensate for the reduced intensity of light from top light-emitting diodes 72T relative to bottom light-emitting diodes 72B.

The examples described above in which top light-emitting diodes 72T are floating with respect to m-chassis 86M and bottom light-emitting diodes 72B are attached to m-chassis 86M is merely illustrative. If desired, top light-emitting diodes 72T may be attached to m-chassis 86M and bottom light-emitting diodes 72B may be floating relative to m-chassis 86M. In this type of arrangement, bottom light-emitting diodes 72B may be provided with a lower drive power and/or may be fewer in number than that of top light-emitting diodes 72T. To compensate for the resulting reduction in brightness at the bottom side of light guide layer 78, light leakage promotion structures may achieve maximum light leakage at a location on light guide layer that is closer to bottom side 76B than top side 76T.

The foregoing is merely illustrative and various modifications can be made by those skilled in the art without departing from the scope and spirit of the described embodiments. The foregoing embodiments may be implemented individually or in any combination.

What is claimed is:
1. A backlight assembly that provides backlight illumination for a display, comprising:
   a light guide layer having opposing first and second opposing side surfaces and having light leakage promotion features that allow light to escape from the light guide layer to the display, wherein the light leakage promotion features have a peak density at a location on the light guide layer that is closer to the first side surface than the second side surface;
   a first light source that emits light of a first brightness into the first side surface of the light guide layer; and
   a second light source that emits light of a second brightness into the second side surface of the light guide layer, wherein the first brightness is less than the second brightness.
2. The backlight assembly defined in claim 1 wherein the light leakage promotion features comprise features selected from the group consisting of: notches in the light guide layer, protrusions on the light guide layer, ink dots on the light guide layer, and roughened portions of the light guide layer.
3. The backlight assembly defined in claim 1 further comprising:
   a metal support structure at least partially surrounding the light guide layer.
4. The backlight assembly defined in claim 3 wherein the first light source is free to move relative to the metal support structure to accommodate thermal expansion of the light guide layer and the second light source is fixed relative to the metal support structure.
5. The backlight assembly defined in claim 4 wherein the metal support structure conducts heat away from the second light source.
6. The backlight assembly defined in claim 1 wherein the first light source comprises light-emitting diodes on a first substrate and the second light source comprises light-emitting diodes on a second substrate.
7. The backlight assembly defined in claim 6 wherein the light-emitting diodes on the first substrate are fewer in number than the light-emitting diodes on the second substrate.
8. The backlight assembly defined in claim 6 wherein the light-emitting diodes on the first substrate are operated at a lower drive power value than the light-emitting diodes on the second substrate.
9. The backlight assembly defined in claim 6 wherein the second substrate comprises a metal-core printed circuit board that conducts heat away from the second light source.
10. The backlight assembly defined in claim 6 wherein the first substrate is a flexible printed circuit substrate that is attached to the light guide layer with adhesive.
11. A backlight assembly for providing backlight to a display, comprising:
   a light guide layer having first and second opposing sides and having a center that is halfway between the first and second opposing sides;
   a first set of light-emitting diodes that emit light into the first side of the light guide layer;
   a second set of light emitting diodes that emit light into the second side of the light guide layer; and
   light leakage promotion features on a surface of the light guide layer that allow light to escape from the light guide layer towards the display, wherein the light leakage promotion features are asymmetric relative to the center of the light guide layer.
12. The backlight assembly defined in claim 11 wherein the light emitted by the first set of light-emitting diodes is less bright than the light emitted by the second set of light emitting diodes.

13. The backlight assembly defined in claim 11 wherein the light leakage promotion features have a peak density at a location on the light guide layer that is between the center and the first side.

14. The backlight assembly defined in claim 11 wherein the first set of light-emitting diodes is mounted to a flexible printed circuit and the second set of light-emitting diodes is mounted to a metal-core printed circuit board.

15. A backlight assembly, comprising:
   first and second light sources;
   a light guide layer having first and second opposing sides, wherein the first side receives light from the first light source and the second side receives light from the second light source and wherein the light received by the first side of the light guide layer is less bright than the light received by the second side of the light guide layer; and
   light scattering features on the light guide layer that allow light to escape from the light guide layer towards a display layer, wherein the light scattering features compensate for a difference in brightness between the light received by the first side of the light guide layer and the light received by the second side of the light guide layer.

16. The backlight assembly defined in claim 15 wherein the light scattering features have a maximum density at a position on the light guide layer that is closer to the first side than the second side.

17. The backlight assembly defined in claim 16 wherein an amount of light that escapes a given region of the light guide layer is proportional to a density of the light scattering features in the given region and wherein the position of the maximum density closer to the first side than the second side compensates for the brightness difference between the light received by the first side of the light guide layer and the light received by the second side of the light guide layer.

18. The backlight assembly defined in claim 15 further comprising:
   a thermally conductive chassis that at least partially surrounds the light guide layer, wherein the first light source is free to move relative to the thermally conductive chassis and the second light source is fixed relative to the thermally conductive chassis.

19. The backlight assembly defined in claim 18 wherein the second light source is mounted to a metal-core printed circuit board that conducts heat away from the second light source to the thermally conductive chassis.

20. The backlight assembly defined in claim 15 wherein the first light source is mounted to a flexible printed circuit that is attached to the light guide layer with adhesive such that the first light source moves with the light guide layer during thermal expansion of the light guide layer.

* * * * *